(12) United States Patent
May

(10) Patent No.: US 7,137,710 B2
(45) Date of Patent: Nov. 21, 2006

(54) PROJECTION SYSTEM

(75) Inventor: Gregory J May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 21 days.

(21) Appl. No.: 10/628,947

(22) Filed: Jul. 28, 2003

(65) Prior Publication Data

US 2005/0024607 A1    Feb. 3, 2005

(51) Int. Cl.
G03B 21/00 (2006.01)
G03B 31/00 (2006.01)
G03B 21/56 (2006.01)
H04N 5/74 (2006.01)

(52) U.S. Cl. .................. 353/122; 353/15; 359/444; 359/449; 348/771; 352/12

(58) Field of Classification Search ............. 353/15, 353/20, 30, 31, 37, 122, 94; 359/443, 444, 359/460, 449; 381/2, 77, 80, 85, 300, 303, 381/306, 307, 309, 311; 348/744, 759, 770, 348/771; 352/1, 12, 19, 20, 23, 36, 61; 349/7–10
See application file for complete search history.

(56) References Cited

U.S. PATENT DOCUMENTS

| 4,739,396 | A | 4/1988 | Hyatt |
| 5,241,407 | A | 8/1993 | Sonehara et al. |
| 5,666,422 | A * | 9/1997 | Harrison et al. ............ 381/18 |
| 5,739,875 | A * | 4/1998 | Toide et al. .............. 348/744 |
| 5,867,223 | A | 2/1999 | Schindler et al. |
| 6,018,374 | A | 1/2000 | Wrobleski |
| 6,195,436 | B1 | 2/2001 | Scibora et al. |
| 6,212,282 | B1 | 4/2001 | Mershon |
| 6,283,862 | B1 * | 9/2001 | Richter ..................... 463/51 |
| 6,339,748 | B1 * | 1/2002 | Hiramatsu ................ 702/159 |
| 6,377,306 | B1 * | 4/2002 | Johnson et al. ........... 348/383 |
| 6,483,568 | B1 * | 11/2002 | Folio ........................ 352/20 |
| 6,727,935 | B1 * | 4/2004 | Allen et al. ............ 348/14.03 |
| 6,811,267 | B1 * | 11/2004 | Allen et al. ............... 353/122 |
| 2003/0002689 | A1 | 1/2003 | Folio |
| 2003/0086574 | A1 | 5/2003 | Higgs |
| 2004/0095558 | A1 * | 5/2004 | Whitehead et al. .......... 353/30 |

FOREIGN PATENT DOCUMENTS

| JP | 55-102980 | 8/1980 |
| JP | 4-240978 | 8/1992 |
| JP | 06-141257 | * 5/1994 |

* cited by examiner

Primary Examiner—W. B. Perkey
Assistant Examiner—Rochelle Blackman

(57) ABSTRACT

A method for presenting secondary information to a video-viewing audience comprises projecting video images onto a screen and projecting invisible light signals encoded to represent secondary information associated with said video images onto the screen concurrently with said video images.

3 Claims, 6 Drawing Sheets

PROJECTION SYSTEM

BACKGROUND

Projection systems for displaying motion pictures, television, video games, digital video discs (DVDs), VCR tapes, digital cable, and the like (collectively, "video") generally include various electronic components that receive, process, and selectively channel light from one or more light sources (such as a light bulb) along one or more corresponding optical paths to a projection lens. The projection lens projects the channeled light onto a screen to form visible images, which can be viewed by human observers. Various versions of such systems are commonly used in movie theaters, corporations, and residential homes for allowing people to view motion pictures, television, video games, and presentations.

Projection systems also commonly include an audio source that transmits audio information relating to the projected images (a "soundtrack") to speakers, which are typically hard-wired to the audio source. The speakers may be integral with or physically-separated from the projection system. The human observers can then hear the soundtrack as they view the video.

Many times, there are multiple soundtracks associated with a given video. For example, many DVDs include a standard soundtrack for the motion picture and a "director's narration" soundtrack, wherein the director of the motion picture narrates commentary over the standard soundtrack. Further, for example, many DVDs include soundtracks in multiple languages for the same video. Currently, when several people simultaneously watch the same video in the same room, they are constrained to listen to the same soundtrack. The inventors have recognized that it would be desirable to have a projection system that allows different human observers watching the same video to listen to different associated soundtracks simultaneously. For example, when a group of people watch a video at the same time, some people in the group may want to listen to the standard soundtrack, whereas others may want to listen to the "director's narration" soundtrack (or a different language).

Furthermore, it is common for the audio portion of many projection systems to include some version of "surround sound", wherein the soundtrack is delivered from speakers located at different places around the room. The speakers used in most surround sound systems are hard-wired to the audio source of the projection system. Many times it is difficult to hard-wire remote speakers to the audio source in a convenient and aesthetically-pleasing way. Accordingly, the inventors have recognized that it would be desirable to have a projection system that facilities convenient, effective wireless installation of surround sound systems to be used with the projection system.

The disclosed invention was developed in view of these and other problems associated with video projection systems.

DETAILED DESCRIPTION

Figure 1:
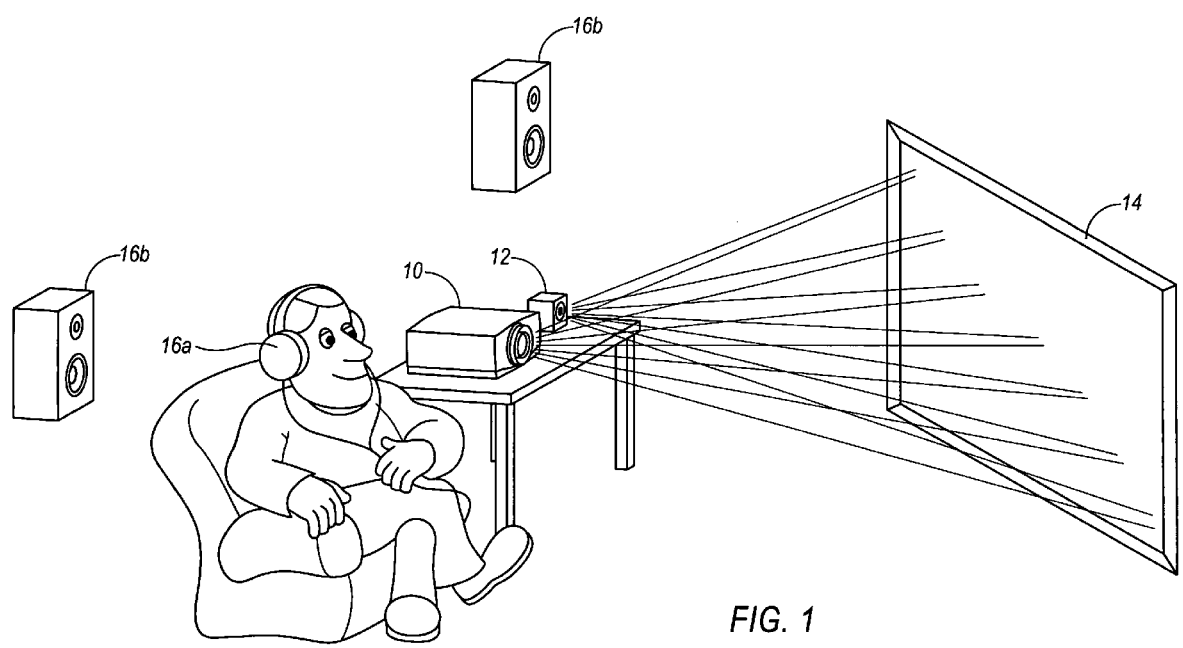
FIG. 1 illustrates an audio-visual system, implemented according to one embodiment of the invention.
Figure 3:
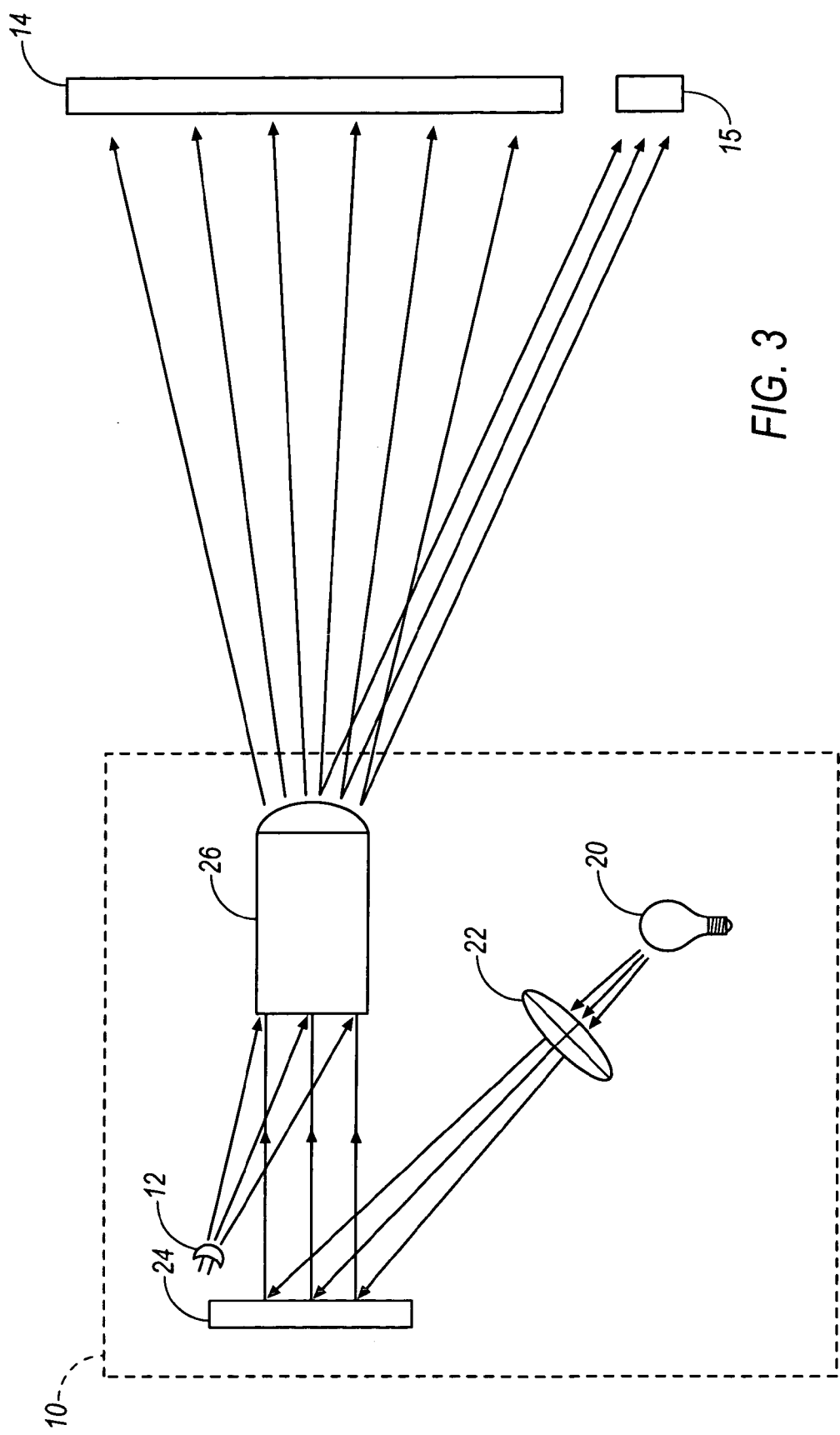
FIG. 3 illustrates an embodiment of a projection device, showing a secondary signal being projected to a second screen.

FIG. 1 illustrates an exemplary embodiment of a projection system implemented in accordance with the present invention. The projection system generally includes a projection device 10, a secondary signal transmitter 12, a screen 14, and at least one receiver 16a, b. The projection device 10 projects video onto the screen 14 for human observers to watch. The screen 14 can comprise a number of different types of surfaces upon which video images can be projected, such as reflective screens and surfaces (as used with front projection systems shown in FIG. 1) and transflective screens (as used with rear projection systems, not shown). The secondary signal transmitter 12 projects a secondary light signal onto the screen 14 that is not visible to naked human eyes. Useful formats for the secondary signals include, for example, infrared (IR) signals and ultraviolet (UV) light. The secondary signal is encoded with secondary information associated with the video, such as, for example, audio information. The secondary light signal is reflected off of the screen 14 (or a second screen, as shown in FIG. 3. for example) to the receiver(s) 16, where it is received and decoded. When the secondary information is audio information, it is decoded into audibly-perceptible sounds. When the projection system is a rear-projection system, the secondary light signal is transmitted through the transflective screen to the receivers in the viewing room.

Figure 1A:
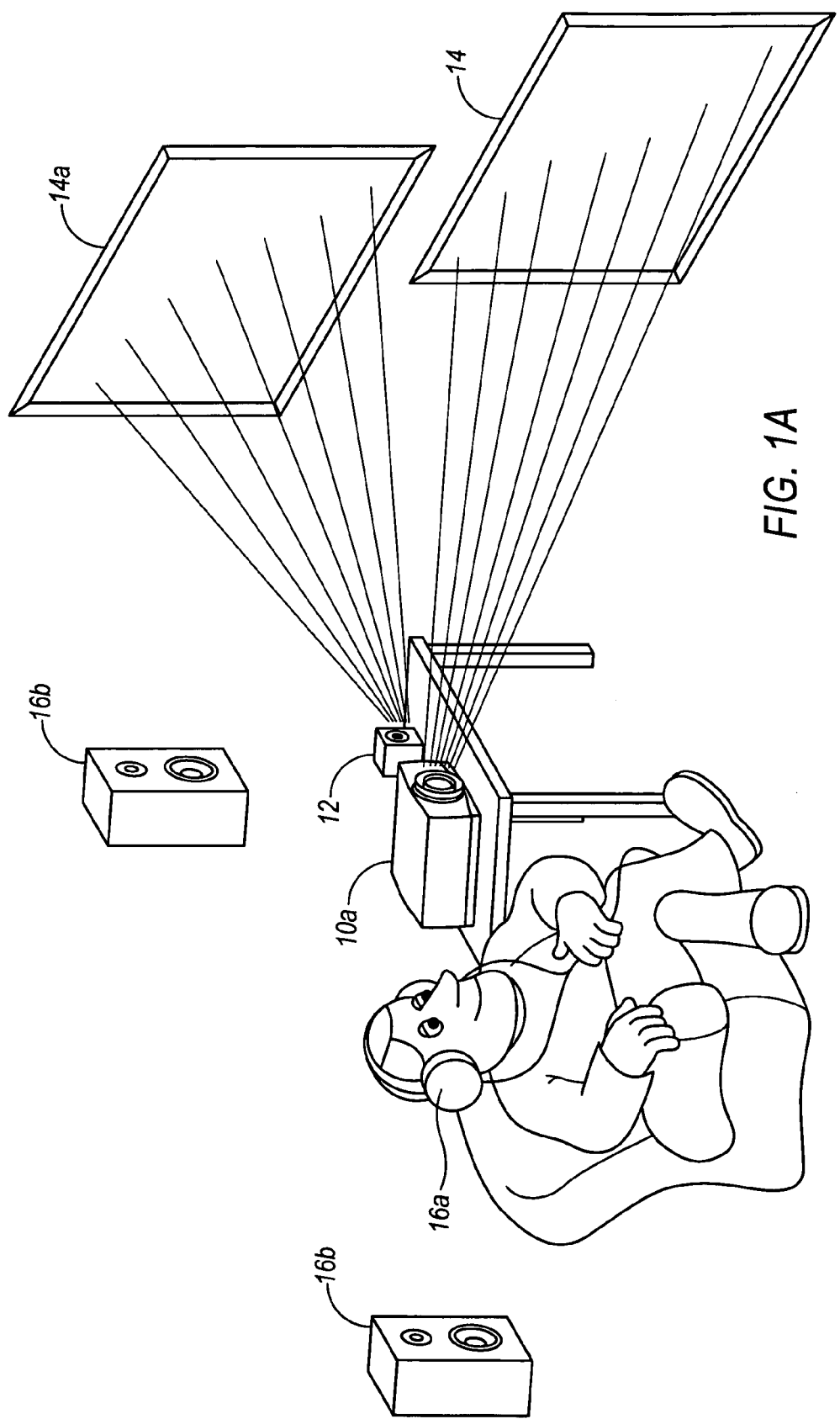
FIG. 1A illustrates the audio visual system of FIG. 1 including a second screen.

FIG. 1 illustrates secondary signal transmitter 12 in a location independent from projection device 10, though, as illustrated in other embodiments herein, secondary signal transmitter 12 may be located at a variety of positions inside of or attached to the outside of projection device 10. Irrespective of its position relative to the projection device 10, secondary signal transmitter 12 is positioned so as to transmit an invisible encoded light signal to the screen 14 (or to a second screen 14a as shown in FIG. 1A). The secondary light signal is reflected from the screen 14 to receivers 16a and 16b located in the same room as the projection device 10. The receivers 16a and 16b are configured to receive the reflected invisible signals and decode those signals into audibly-perceptible sounds, i.e., the soundtrack of the video. In the case of a rear-projection system (not shown), the receivers would receive the secondary light signal transmitted through the transflective screen. In various implementations of the invention, a single receiver could be used, or multiple receivers, as shown in FIG. 1, could be used simultaneously. Possible receivers include headphones 16a and wireless speakers 16b, as well as other types of receivers, that incorporate a receiver device (not shown) and a decoding device (not shown) for receiving the secondary light signal and decoding it into an audibly-perceptible sound.

The secondary signal transmitter 12 may encode the invisible secondary light signals to represent audio information (or other types of secondary information) using a variety of methods, including digital or analog modulation. Similarly, receivers 16 may be configured to decode the secondary light signal using a variety of methods, such as digital or analog demodulation, provided that the decoding method match the encoding method used by the secondary signal transmitter 12.

Though not necessary to implement the invention, in certain embodiments, the secondary signal transmitter 12 may be configured to transmit multiple channels of audio information via the invisible light signals effectively simultaneously. Transmitting multiple channels of audio information may be useful for allowing each human viewer watching a video in the same room to listen to different associated soundtracks, as well as for implementing wireless stereo and surround sound audio delivery systems. One such method of transmitting and receiving different channels of audio information via the invisible signal is by polarizing the secondary signal before it is transmitted to the screen 14 such that each channel of audio information has a different polarization. For example, a first channel of audio information could be transmitted by secondary signal transmitter 12 having a vertical polarization, and a second channel of audio information could be transmitted by secondary signal transmitter 12 having a horizontal polarization. Another method would include using multiple secondary signal transmitters 12, each being configured to transmit a different channel of invisible signals toward screen 14 using various methods of encoding, such as digital or analog modulation, to separate the different channels of audio information represented by the invisible light signals.

When the system is configured to transmit multiple channels of audio information toward the screen 14 (or other screen 14a as shown in FIG. 1A), then it is desirable that the receivers 16 be configured to be able to receive and decode the different reflected channels of light signals carrying audio information. Depending on the implementation of the invention, the different receivers 16 (e.g., the different speakers 16b and headphone sets 16a) each may be permanently pre-configured to receive and decode a particular channel of audio information. Alternatively, the different receivers 16 may each be configured with a channel selector, dial, or other mechanism for selecting different ones of the available channels of audio information to receive and decode. For example, each speaker 16b and/or pair of headphones 16a could be equipped with a channel selector (not shown) that would allow a user to selectively configure the speaker to receive and decode a particular channel of audio information. Moreover, where headphones 16a are used in the system, each speaker in a given set of headphones (i.e., each "ear") could be configured (either permanently or selectively using a channel selector) to receive and decode different channels of the reflected audio information, which could be used to deliver stereo sound to the human user.

The transmission and reflection of different channels of audio information via the invisible light signals can be used in a variety of ways. For example, it is common for surround sound systems to deliver five, seven, or more different channels of audio information, each channel being specific to a different speaker in the room. Therefore, where an embodiment of the invention is used to implement a surround sound system in a room, each channel of audio information (via the invisible secondary light signals) could be received and decoded by a different speaker 16b in the room to effectuate the surround sound effect. Moreover, where headphones 16a are used as the receiver, each "ear" of the set of headphones could be permanently or selectively configured to receive a different channel of audio information to deliver a stereo sound to the listener. Further, the different channels of transmitted audio information could be used to deliver different soundtracks associated with the same video to the different human viewers in the same room. For instance, the secondary signal transmitter 12 could be configured to transmit one or more channels of encoded audio information that represents a version of the associated soundtrack in English, Spanish, and French, as well as a "director's narration" soundtrack, all effectively simultaneously. The human viewers could each use different receivers (e.g., headphone sets) to selectively determine which channel(s) of audio information to receive and decode. In this way, different human viewers watching a video in the same room could listen to different soundtracks associated with the video.

The secondary signal transmitter 12 may take a variety of forms and be located at a variety of positions within the system. The secondary signal transmitter 12 may be positioned inside or outside of the projection device 10, and, if outside, the secondary transmitter 12 may be integral with, attached to, or physically-separate from (as shown in FIG. 1) the projection device 10. In one embodiment, the secondary transmitter 12 is a light emitting diode (LED) that is configured to emit an infrared (IR) light signal. Of course, various other devices, including lasers, may be used as the secondary signal transmitter 12 to transmit invisible light signal toward screen 14. If the secondary signal transmitter 12 is located separate from the projection device 10, then the secondary transmitter 12 may also include a separate lens (not shown) that projects the light signal emitted from the LED into the screen 14 to maximize coverage of the screen 14. Though not necessary for the invention hereof, maximizing the surface area of the screen onto which the secondary signal is transmitted maximizes the efficiency and performance of the reflected signal.

Figure 2A:
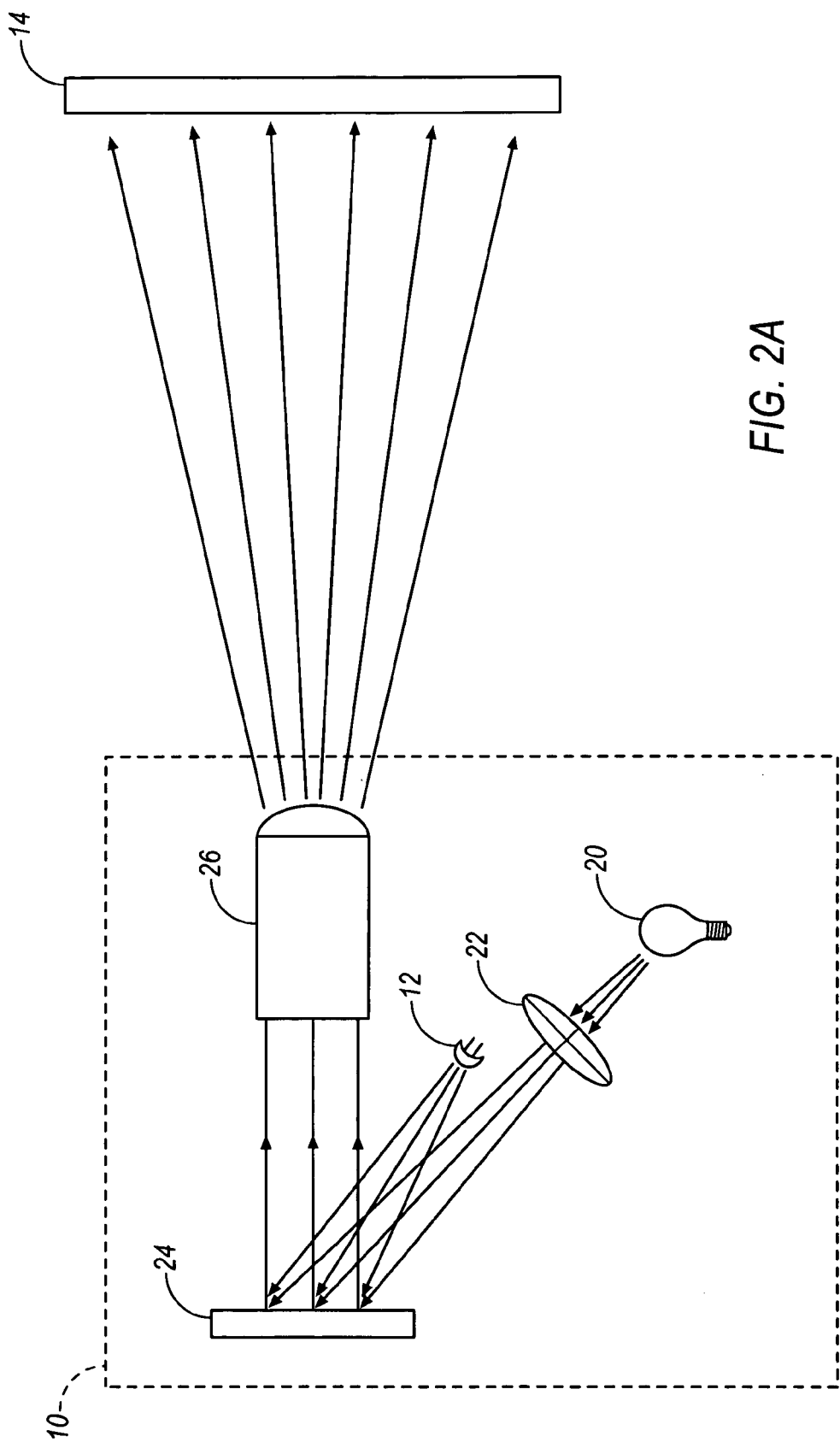
FIG. 2A illustrates an embodiment of a projection device, showing one possible location of an integral secondary signal transmitter.
Figure 2B:
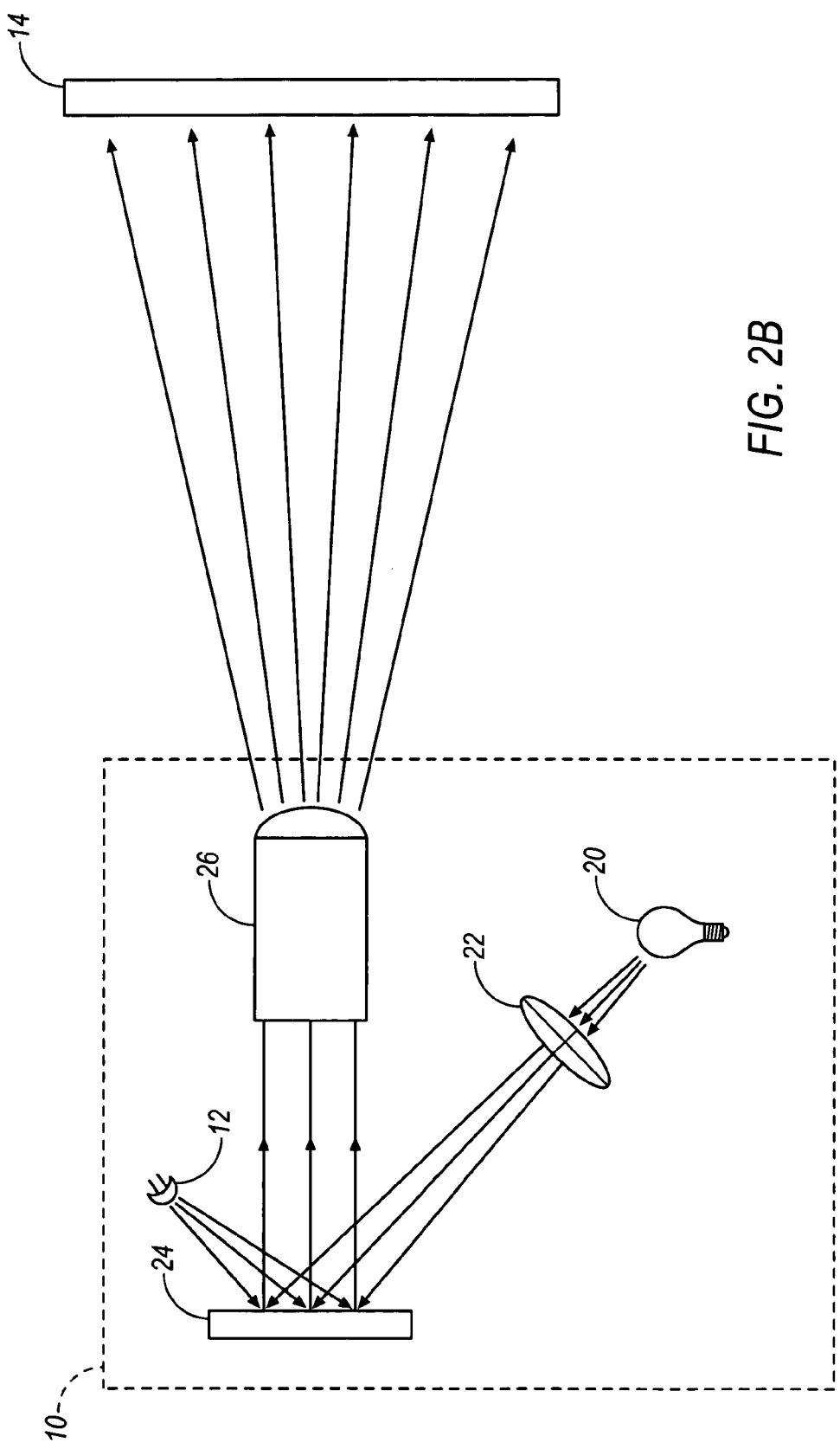
FIG. 2B illustrates an embodiment of a projection device, showing a second possible location of an integral secondary signal transmitter.
Figure 2C:
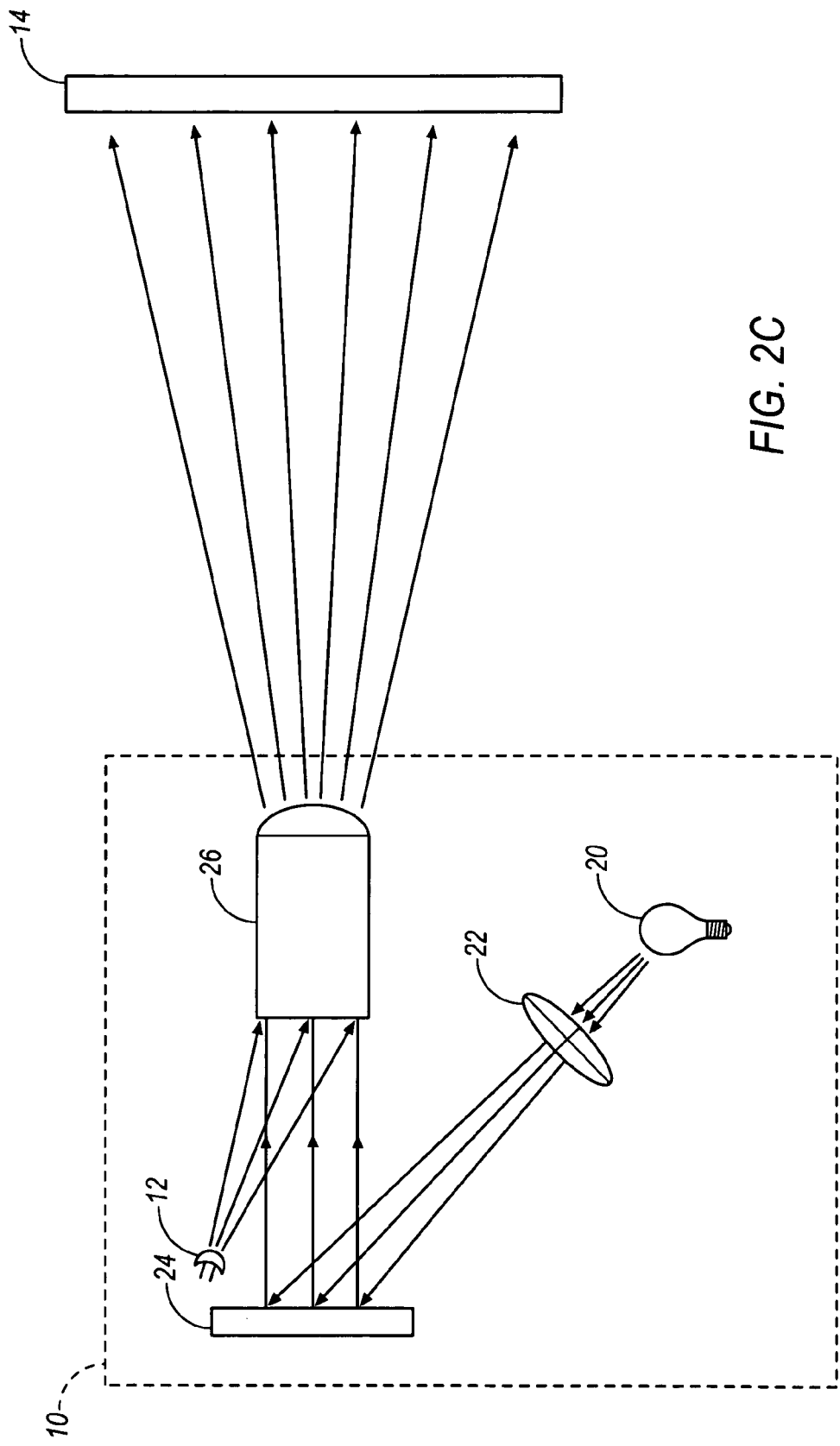
FIG. 2C illustrates an embodiment of a projection device, showing a third possible location of an integral secondary signal transmitter.

FIGS. 2a–2c illustrate an exemplary projection system 10 in schematic format that could be used in connection with an embodiment of the present invention, as well as different possible implementations of the secondary signal transmitter 12 integrated into the projection system 10. This particular illustrated projection system 10 includes a light source 20, such as a bulb. The light source 20 emits light through a color wheel 22, which reflects off of a digital micromirror device (DMD) 24, which is comprised of a plurality of very small, individually-tiltable micromirrors (not shown), each of which being configured to correspond to a unique pixel on the screen 14. Each of the micromirrors on the DMD is tilted so as to direct light from the light source 20 either toward or away from the screen 14. When directed toward the screen 14, the light passes through a lens 26, which projects the light onto the screen 14. By rapidly tilting each of the micromirrors so as to alternatively direct light toward and away from the screen 14 at different frequencies, viewable images are projected through the lens 26 onto the screen 14.

If the secondary signal transmitter 12 is positioned inside of projection device 10, it could be located at a variety of different positions therein. Though not necessary, it is useful to position the secondary signal transmitter 12 such that it emits its invisible light signal through lens 26, which projects the signal onto screen 14. In this way, a single lens 26 can be used to display the visible light image of the video, as well as project the invisible light signal carrying the audio information. The secondary signal transmitter 12 may be positioned in a variety of ways to achieve this result. For example, as shown in FIG. 2a, the secondary signal transmitter 12 could be mounted inside of the projection device 10 essentially in the path of the primary video light signal such that the secondary audio light signal is reflected by the DMD 24 through the lens 26 to the screen 14. Alternatively, the secondary signal transmitter 12 may be positioned, as shown in FIG. 2b, such that the secondary signal is reflected by the DMD 24 through the lens 26, but so that it is done outside of the primary light path from light source 20. In the embodiment shown in FIG. 2b, the secondary signal transmitter is positioned so that the secondary light signal is reflected by each of the micromirrors on the DMD 24 when the micromirror is tilted "away" from the primary light source, and "toward" the secondary signal transmitter 12. In any given video transmission, each micromirror is tilted "away" from the primary light source a sufficient amount of the time to adequately reflect the secondary light signal in this configuration. Finally, the secondary signal transmitter 12 may be positioned "off-axis" relative to the light path reflected from the DMD 24, such as shown in FIG. 2C, such that the secondary signal transmitter 12 emits the invisible light signal directly through the lens 26 without being reflected by the DMD 24. When the secondary signal transmitter 12 is positioned "off-axis," it may project signals through the lens 26 to a second screen 15, as shown in FIG. 3.

Embodiments of the invention provide various benefits. One such benefit is that viewers of the same video in the same room can listen to different soundtracks, depending on their preferences. This benefit is best achieved where the receivers 16 are headphone sets 16a. Further, where the system is used to implement a surround sound system, the speakers used to implement the system can communicate with the audio source wirelessly. Reflecting the secondary signal off of the screen 14 provides a greater likelihood that the receivers 16 will receive the secondary signal, as there is a greater likelihood that there will be a clear path between the screen 14 and the receivers 16 than between the projection device 10 and the receivers 16. Other benefits of various embodiments of the invention will be recognized by one skilled in the art.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements. Further, the use of the words "first", "second", and the like do not alone imply any temporal order to the elements identified. The invention is limited only by the following claims

The invention claimed is:

1. A projection system, comprising:
a projection device including a digital micromirror device having a plurality of micromirrors that each selectively reflects light from a primary light source through a lens to project visible video images onto a screen; and
a secondary signal transmitter configured to emit invisible light signals such that said invisible light signals are reflected by said micromirrors through said lens and onto said screen, said light signals being encoded to represent secondary information associated with said video images;
wherein said invisible light signals are reflected by each of said micromirrors through said lens at times when light from said primary light source is not reflected through said lens by said respective micromirror.

2. The system of claim 1, wherein said invisible light signals are reflected by said micromirrors concurrently with light from said primary light source.

3. A projection system, comprising:
a projection device configured to project visible video images onto a first screen;
a secondary signal transmitter configured to project invisible light signals encoded to represent secondary information associated with said video images onto a second screen; and
wherein said visible video images and said invisible light signals are transmitted through a common lens concurrently.

* * * * *